US012326020B2

(12) United States Patent
Nishizuka

(10) Patent No.: US 12,326,020 B2
(45) Date of Patent: Jun. 10, 2025

(54) INSIDE HANDLE DEVICE

(71) Applicant: ALPHA CORPORATION, Kanagawa (JP)

(72) Inventor: Mitsuo Nishizuka, Kanagawa (JP)

(73) Assignee: ALPHA CORPORATION, Kanagawa (JP)

( * ) Notice: Subject to any disclaimer, the term of this patent is extended or adjusted under 35 U.S.C. 154(b) by 117 days.

(21) Appl. No.: 18/339,841

(22) Filed: Jun. 22, 2023

(65) Prior Publication Data

US 2023/0332445 A1 Oct. 19, 2023

Related U.S. Application Data

(63) Continuation of application No. PCT/JP2021/045909, filed on Dec. 13, 2021.

(30) Foreign Application Priority Data

Dec. 23, 2020 (JP) ................................ 2020-213846

(51) Int. Cl.
*E05B 85/12* (2014.01)
*E05B 79/06* (2014.01)

(52) U.S. Cl.
CPC .............. *E05B 85/13* (2013.01); *E05B 79/06* (2013.01); *E05B 85/12* (2013.01)

(58) Field of Classification Search
CPC .......... E05B 79/06; E05B 79/22; E05B 79/20; E05B 85/10; E05B 85/02; E05B 85/13;
(Continued)

(56) References Cited

U.S. PATENT DOCUMENTS 3,795,416 A * 3/1974 Hehl ........................ E05B 85/12 292/336.3
4,580,822 A * 4/1986 Fukumoto ............... E05B 85/12 292/DIG. 31
(Continued)

FOREIGN PATENT DOCUMENTS

EP 3173552 A1 * 5/2017 ............. E05B 77/06
EP 3812544 A1 * 4/2021 ............. E05B 79/06
(Continued)

OTHER PUBLICATIONS

Extended European Search Report issued in EP 21 91 0449.4-1005 by the European Patent Office on Oct. 23, 2024 which is related to U.S. Appl. No. 18/339,841.
(Continued)

*Primary Examiner* — Kristina R Fulton
*Assistant Examiner* — Faria F Ahmad
(74) *Attorney, Agent, or Firm* — Studebaker Brackett PLLC

(57) ABSTRACT

An inside handle device includes a handle case, and a handle lever rotatably supported by the handle case. The handle lever is inserted into the handle case along a rotation axis of the handle lever with respect to the handle case. The handle case includes a case main body into which the handle lever is inserted, and a coming-off prevention member configured to restrict a movement of the handle lever in a direction along the rotation axis and to prevent the handle lever from coming off the case main body. The coming-off prevention member is coupled to the case main body. The coming-off prevention member is configured to be displaceable between an assembling position at which the handle lever is prevented from coming off the case main body and an unfolded position at which the coming-off prevention member is unfolded from the assembling position.

10 Claims, 8 Drawing Sheets

(58) Field of Classification Search
CPC .......... E05B 85/12; E05B 85/14; E05B 85/16; E05B 85/18
See application file for complete search history.

(56) References Cited

U.S. PATENT DOCUMENTS

| | | | | |
|---|---|---|---|---|
| 4,838,590 | A * | 6/1989 | Isomura | E05B 85/12 292/DIG. 31 |
| 5,101,597 | A * | 4/1992 | Pelachyk | E05B 79/06 49/460 |
| 5,263,750 | A * | 11/1993 | Smith | E05B 85/12 292/DIG. 31 |
| 5,284,373 | A * | 2/1994 | Watson | E05B 79/06 292/DIG. 64 |
| 5,653,411 | A * | 8/1997 | Picco | F16L 3/2235 24/339 |
| 5,794,994 | A * | 8/1998 | Miyagawa | E05B 85/13 292/DIG. 31 |
| 5,895,081 | A | 4/1999 | Tanimoto et al. | |
| 6,052,948 | A * | 4/2000 | Spitzley | E05B 79/06 49/460 |
| 6,167,779 | B1 * | 1/2001 | Sano | E05B 85/13 74/543 |
| 6,758,503 | B2 * | 7/2004 | Sadler | E05B 5/00 292/DIG. 31 |
| 6,976,717 | B2 * | 12/2005 | Barr | E05B 79/06 292/DIG. 64 |
| 7,163,240 | B2 * | 1/2007 | Odahara | E05B 77/06 292/347 |
| 8,727,401 | B2 * | 5/2014 | Tanaka | E05B 85/12 292/354 |
| 8,746,759 | B2 * | 6/2014 | Bailey | E05B 85/12 292/DIG. 64 |
| 9,248,722 | B2 * | 2/2016 | Gillay | E05B 17/0062 |
| 9,316,020 | B2 * | 4/2016 | Lee | E05B 1/003 |
| 10,323,680 | B2 * | 6/2019 | Carabalona | F16C 1/101 |
| 10,954,697 | B2 * | 3/2021 | Sugimoto | E05B 85/12 |
| 11,384,574 | B2 * | 7/2022 | Kin | E05B 85/12 |
| 11,391,073 | B2 * | 7/2022 | Rhein | E05B 81/90 |
| 11,643,854 | B2 * | 5/2023 | Kin | E05B 79/20 292/336.3 |
| 2004/0244145 | A1 * | 12/2004 | Anscher | C10G 17/04 16/222 |
| 2004/0244149 | A1 * | 12/2004 | Anscher | B29C 45/0053 16/386 |
| 2005/0134058 | A1 | 6/2005 | Belchine et al. | |
| 2005/0134059 | A1 * | 6/2005 | Ichino | E05B 85/12 292/336.3 |
| 2007/0001477 | A1 * | 1/2007 | Syed | B60J 5/0416 296/146.7 |
| 2008/0018120 | A1 * | 1/2008 | Bailey | E05B 85/12 292/336.3 |
| 2013/0038074 | A1 * | 2/2013 | Mori | E05B 79/20 292/336.3 |
| 2013/0088022 | A1 | 4/2013 | Collado et al. | |
| 2014/0076094 | A1 * | 3/2014 | Mori | E05B 79/20 74/502.2 |
| 2014/0239652 | A1 * | 8/2014 | Bailey | E05B 85/12 292/336.3 |
| 2015/0224858 | A1 * | 8/2015 | Yoshimoto | E05B 79/06 292/336.3 |
| 2019/0010737 | A1 * | 1/2019 | Kovie | E05B 85/12 |
| 2020/0080352 | A1 | 3/2020 | Kin | |
| 2021/0195768 | A1 * | 6/2021 | Reifenberg | F21S 43/195 |
| 2022/0372801 | A1 * | 11/2022 | Kaya | E05B 81/76 |

FOREIGN PATENT DOCUMENTS

| | | | | |
|---|---|---|---|---|
| JP | H08-291651 | A | 11/1996 | |
| JP | H09-235917 | A | 9/1997 | |
| JP | 2005-307533 | A | 11/2005 | |
| JP | 4294370 | B2 | 7/2009 | |
| JP | 2013-536341 | A | 9/2013 | |
| JP | 2014-034801 | A | 2/2014 | |
| JP | 2018-197428 | A | 12/2018 | |
| WO | WO-2020020632 | A1 * | 1/2020 | E05B 79/06 |

OTHER PUBLICATIONS

International Search Report issued in PCT/JP2021/045909; mailed Feb. 15, 2022.

Written Opinion issued in PCT/JP2021/045909; mailed Feb. 15, 2022.

* cited by examiner

INSIDE HANDLE DEVICE

CROSS-REFERENCE TO RELATED APPLICATIONS

The present application is a continuation application of PCT/JP2021/045909 that claims priority to Japanese Patent Application No. 2020-213846 filed on Dec. 23, 2020, the entire content of which is incorporated herein by reference.

TECHNICAL FIELD

The present disclosure relates to an inside handle device.

BACKGROUND ART

Patent Literature 1 discloses an inside handle device of a vehicle door in which a lock knob is rotatably assembled between a handle lever and a handle case after the handle lever is rotatably assembled to the handle case, so that the handle lever is prevented from coming off the handle case. Patent Literature 2 discloses an inside handle device of a vehicle door in which a bearing for supporting a pin formed on a handle lever is integrally formed with a handle case, and a movement of the pin in an axial direction is restricted by the bearing, so that the handle lever is prevented from coming off the handle case.

Patent Literature 1: JP2013-536341A

Patent Literature 2: US Patent Application Publication No. 2014/0239652

The inside handle device disclosed in Patent Literature 1 is assembled by attaching the handle lever to the handle case by moving the handle lever along a rotation axis and inserting the handle lever into the handle case, and then pushing the lock knob between the handle lever and the handle case. However, a coming-off prevention structure for the handle lever in the inside handle device described in Patent Literature 1 cannot be applied to an inside handle device that does not include a lock knob.

The inside handle device disclosed in Patent Literature 2 is assembled by aligning a D-cut portion formed on the pin of the handle lever with a slit formed outside the bearing of the handle case, moving the handle lever in a direction orthogonal to the rotation axis, and then rotating the handle lever by 90 degrees. However, a coming-off prevention structure for the handle lever in the inside handle device described in Patent Literature 2 needs to include a frame portion in which a slit is formed above and below the handle case, and cannot be applied to an inside handle device in which the frame portion is not provided above and below the handle case.

SUMMARY OF INVENTION

The present disclosure relates to an inside handle device including a coming-off prevention structure for a handle lever configured to be applicable regardless of whether a lock knob is provided and regardless of a configuration of an accommodation portion of the handle lever in a handle case.

According to the present disclosure, an inside handle device includes a handle case, and a handle lever rotatably supported by the handle case. The handle lever is inserted into the handle case along a rotation axis of the handle lever with respect to the handle case. The handle case includes a case main body into which the handle lever is inserted, and a coming-off prevention member configured to restrict a movement of the handle lever in a direction along the rotation axis and to prevent the handle lever from coming off the case main body. The coming-off prevention member is coupled to the case main body. The coming-off prevention member is configured to be displaceable between an assembling position at which the handle lever is prevented from coming off the case main body and an unfolded position at which the coming-off prevention member is unfolded from the assembling position.

The handle case may further include a coupling portion that couples the case main body and the coming-off prevention member. The coupling portion may include a fixing portion formed integrally with the case main body, an unfolding portion configured to engage with the fixing portion, and a hinge portion configured to couple the unfolding portion to the fixing portion so as to be unfoldable. The coming-off prevention member may be formed integrally with the unfolding portion.

The handle lever may be provided with a shaft insertion hole, the case main body may be configured to be inserted into the shaft insertion hole, and may include a shaft in which a locking groove is formed at a distal end thereof, and the coming-off prevention member may include a locking portion configured to be locked to the locking groove.

The coming-off prevention member may include a first arm portion including the locking portion at a distal end thereof, and a second arm portion connecting the first arm portion and the unfolding portion to each other.

The first arm portion may have flexibility.

A cable configured to transmit a force between the handle lever and a door lock device may be provided, and the cable may be sandwiched between the fixing portion and the unfolding portion when the unfolding portion is engaged with the fixing portion.

The handle case may be an integrally molded product in which the case main body, the coupling portion, and the coming-off prevention member are integrally molded via a connecting piece provided on the hinge portion, and the connecting piece may be configured to be broken when the unfolding portion is rotated around the hinge portion.

DESCRIPTION OF EMBODIMENTS

Hereinafter, the present disclosure will be described in accordance with a preferred embodiment. Note that the present disclosure is not limited to the embodiment described below, and can be appropriately changed without departing from the gist of the present disclosure. In addition, although some of illustration and description of a partial configuration are omitted in the following embodiment, publically known or well-known techniques are appropriately applied to the detailed description of the omitted technology within a range in which contradiction points do not occur with the contents described below.

Figure 1:
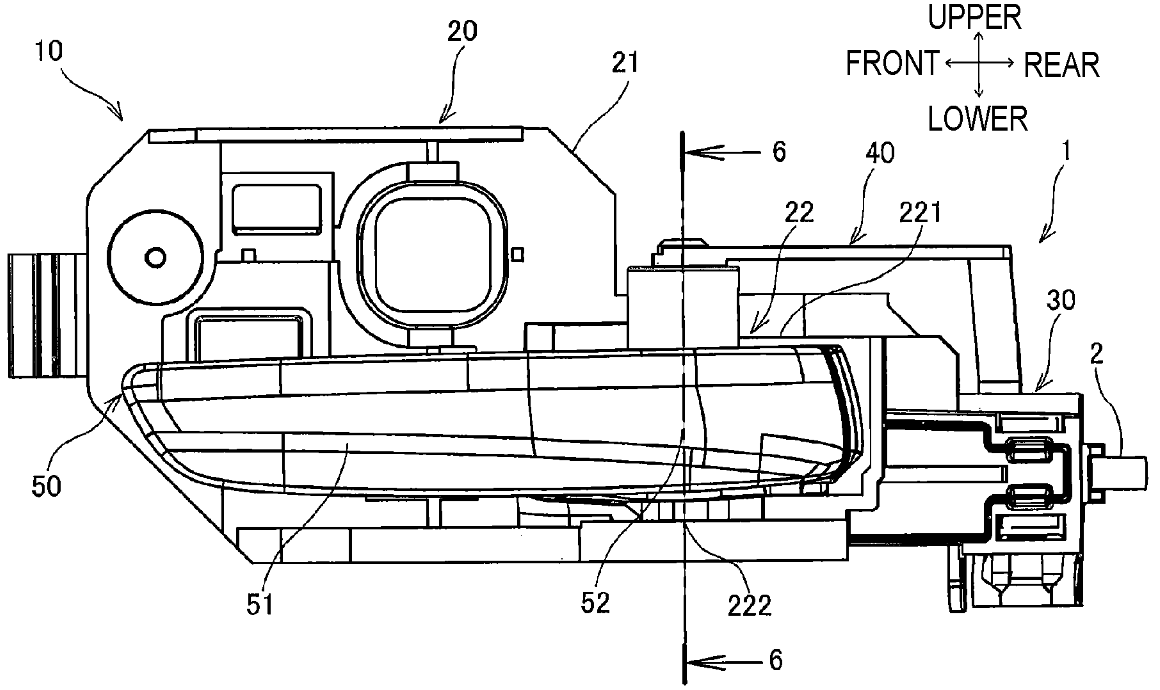
FIG. 1 is a front view showing an inside handle device according to an embodiment as viewed from a vehicle inner side.
Figure 2:
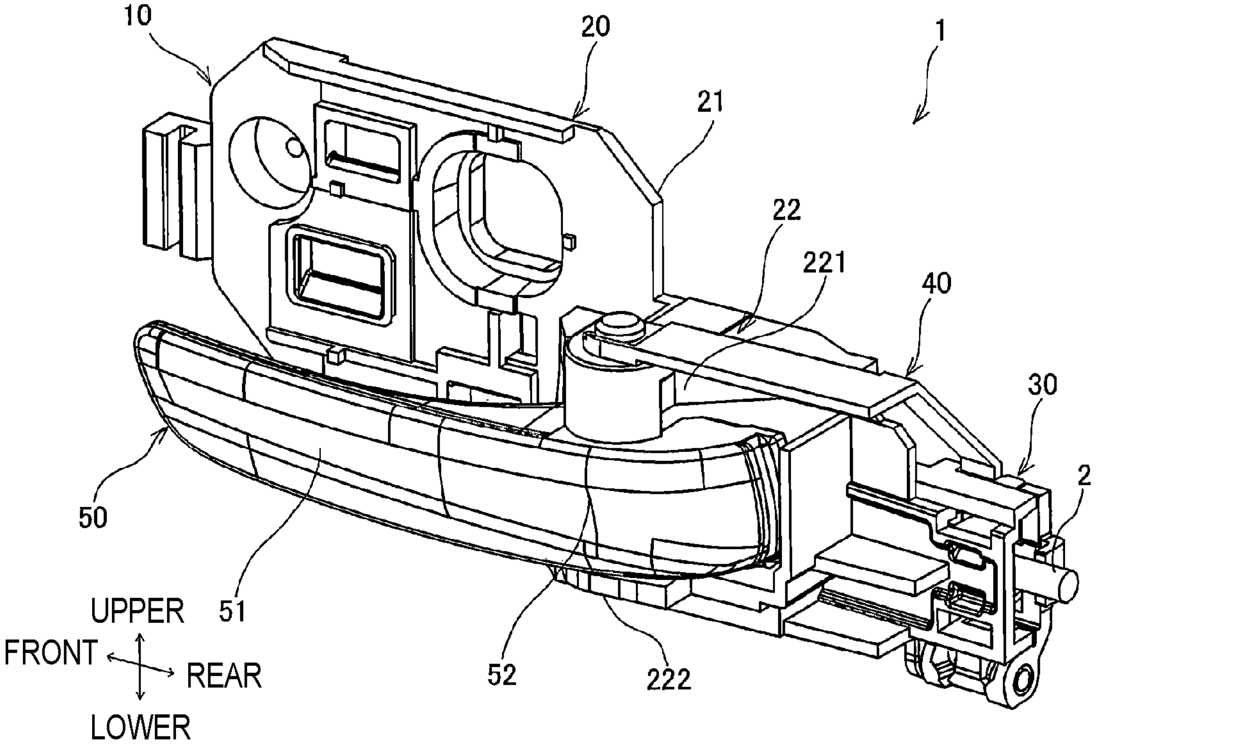
FIG. 2 is a perspective view showing the inside handle device shown in FIG. 1 as viewed from the vehicle inner side.
Figure 3:
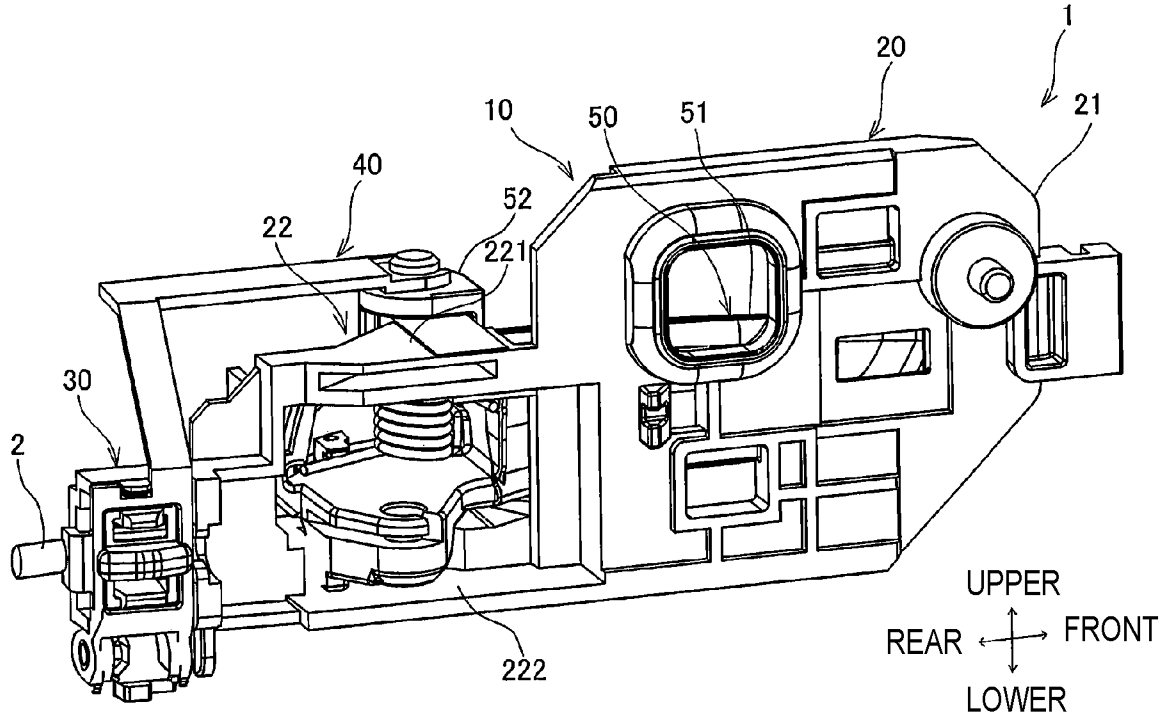
FIG. 3 is a perspective view showing the inside handle device shown in FIG. 1 as viewed from a vehicle outer side.
Figure 4:
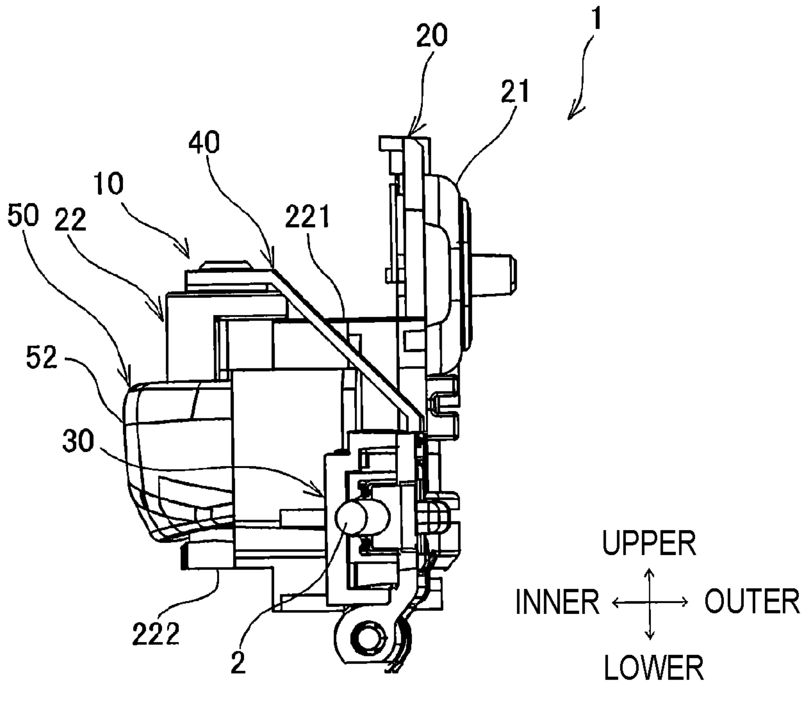
FIG. 4 is a side view showing the inside handle device shown in FIG. 1 as viewed from a vehicle rear side.
Figure 5:
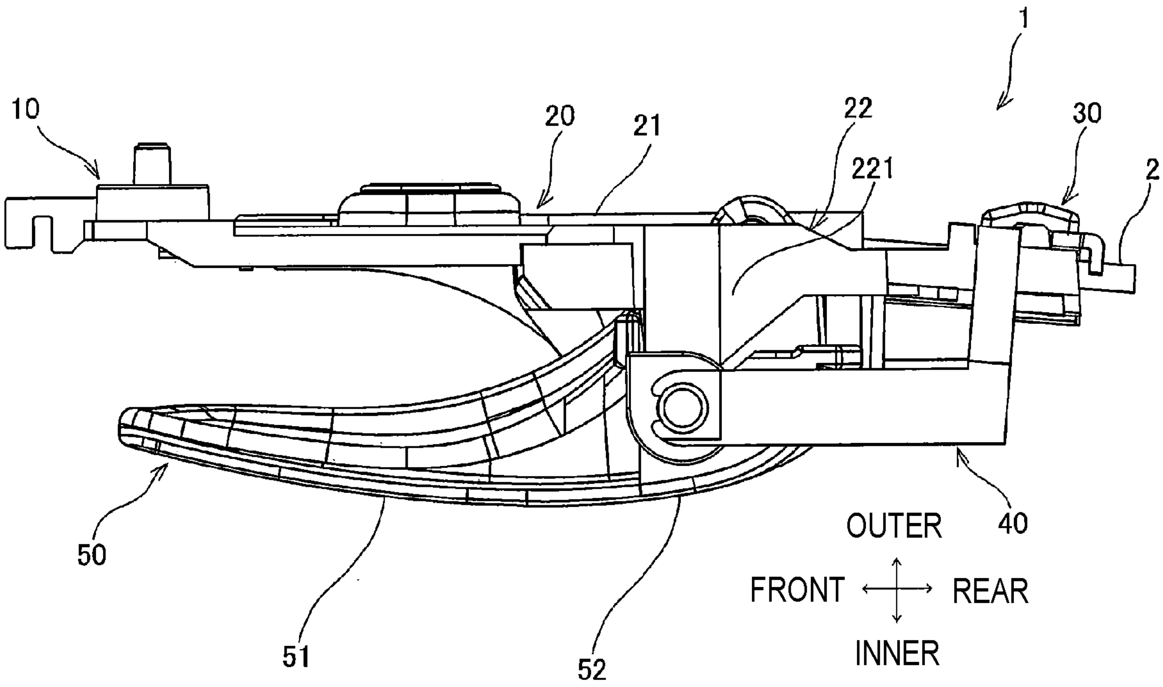
FIG. 5 is a plan view showing the inside handle device shown in FIG. 1.

FIG. 1 is a front view showing an inside handle device 1 according to an embodiment as viewed from a vehicle inner side. FIG. 2 is a perspective view showing the inside handle device 1 shown in FIG. 1 as viewed from the vehicle inner side. FIG. 3 is a perspective view showing the inside handle device 1 shown in FIG. 1 as viewed from a vehicle outer side. FIG. 4 is a side view showing the inside handle device 1 shown in FIG. 1 as viewed from a vehicle rear side. FIG. 5 is a plan view showing the inside handle device 1 shown in FIG. 1. The inside handle device 1 shown in these drawings is a handle device for opening a side door (not shown) of a vehicle from the vehicle inner side. The inside handle device 1 is provided in a door trim (not shown), and is connected to a door lock device (not shown) via a cable 2. In the following description, words indicating directions such as "upper", "lower", "front", "rear", "inner", and "outer" direction correspond to directions toward "upper", "lower", "front", and "rear" of the vehicle, and an "inner side" and an "outer side" of the vehicle in a state in which the inside handle device 1 is attached to the door trim of the vehicle.

The inside handle device 1 includes a handle case 10 and a handle lever 50. The handle lever 50 is rotatably supported by the handle case 10, and the handle case 10 is attached to the door trim so that the handle lever 50 faces the vehicle inner side from the door trim. The handle lever 50 that is not operated extends in a vehicle front-rear direction. A rotation axis of the handle lever 50 is parallel to a vehicle upper-lower direction, and is disposed closer to a rear end than a front end of the handle lever 50 in the vehicle front-rear direction. That is, the handle lever 50 is gripped by a grip portion 51 provided on a side where the front end in the vehicle front-rear direction is provided, and is rotated about a support portion 52 provided on a side where the rear end in the vehicle front-rear direction is provided.

The handle case 10 includes a case main body 20, a cable holding portion 30, and a coming-off prevention member 40. The case main body 20, the cable holding portion 30, and the coming-off prevention member 40 are integrally molded. The case main body 20 is attached to the door trim. In addition, the handle lever 50 is rotatably assembled to the case main body 20.

The case main body 20 includes a flat plate-shaped vertical wall portion 21 attached to the door trim and a lever support portion 22 protruding toward the vehicle inner side from the vertical wall portion 21. The lever support portion 22 is disposed closer to a rear end than a front end of the vertical wall portion 21 in the vehicle front-rear direction, and rotatably supports the support portion 52 of the handle lever 50.

The lever support portion 22 includes an upper support plate 221 and a lower support plate 222. The upper support plate 221 and the lower support plate 222 protrude from the vertical wall portion 21 toward the vehicle inner side so as to be parallel to each other in the vehicle upper-lower direction. In addition, the lower support plate 222 protrudes from a lower end of the vertical wall portion 21 toward the vehicle inner side.

Figure 6:
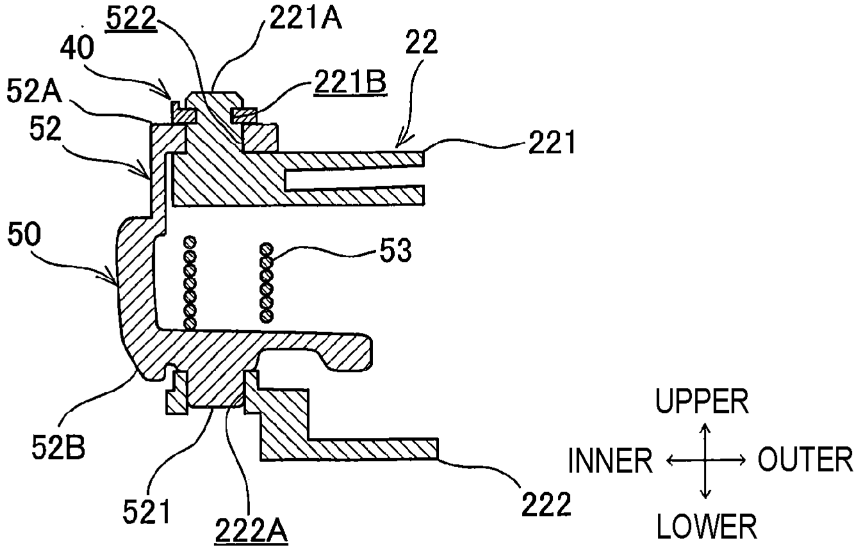
FIG. 6 is a cross-sectional view taken along a line 6-6 of FIG. 1.

FIG. 6 is a cross-sectional view taken along a line 6-6 of FIG. 1, and shows a cross portion including a rotation axis of the support portion 52 of the handle lever 50. As shown in this figure, the support portion 52 of the handle lever 50 is hollow. A spring 53 is disposed inside the support portion 52. The spring 53 urges the handle lever 50 in a direction in which the grip portion 51 approaches the vertical wall portion 21.

A boss 521 is formed on a lower portion 52B of the support portion 52, and a boss insertion hole 522 is formed in an upper portion 52A of the support portion 52. The boss 521 is formed coaxially with the boss insertion hole 522 and protrudes downward. On the other hand, a boss insertion hole 222A is formed in the lower support plate 222 of the lever support portion 22, and a boss 221A is formed on the upper support plate 221 of the lever support portion 22. The boss 221A is formed coaxially with the boss insertion hole 222A and protrudes upward.

The upper portion 52A of the support portion 52 is placed on the upper support plate 221, and the boss 221A of the upper support plate 221 is inserted into the boss insertion hole 522 of the support portion 52. On the other hand, the lower portion 52B of the support portion 52 is placed on the lower support plate 222, and the boss 521 of the support portion 52 is inserted into the boss insertion hole 222A of the lower support plate 222. Accordingly, the support portion 52 is supported by the upper and lower support plates 221 and 222 so as to be rotatable around the boss 221A on an upper side and the boss 521 on a lower side.

When the handle lever 50 is assembled to the handle case 10, the support portion 52 is lowered from the upper side of a final assembling position with respect to the lever support portion 22, whereby the boss 521 of the support portion 52 is inserted into the boss insertion hole 222A of the lower support plate 222, and the boss 221A of the upper support plate 221 is inserted into the boss insertion hole 522 of the support portion 52. Here, a groove 221B is formed in the boss 221A of the upper support plate 221. A lower edge of the groove 221B is positioned at the height of an upper surface of the upper support plate 221. In other words, the lower edge of the groove 221B is defined by the upper surface of the upper support plate 221. When a front end of the coming-off prevention member 40 is engaged with the groove 221B, the coming-off prevention member 40 is configured to prevent the boss 521 on the lower side from coming off the boss insertion hole 222A on the lower side and prevent the boss insertion hole 522 on the upper side coming off the boss 221A on the upper side.

Hereinafter, the coming-off prevention member 40 and the cable holding portion 30 integrally formed with the coming-off prevention member 40 will be described.

Figure 7:
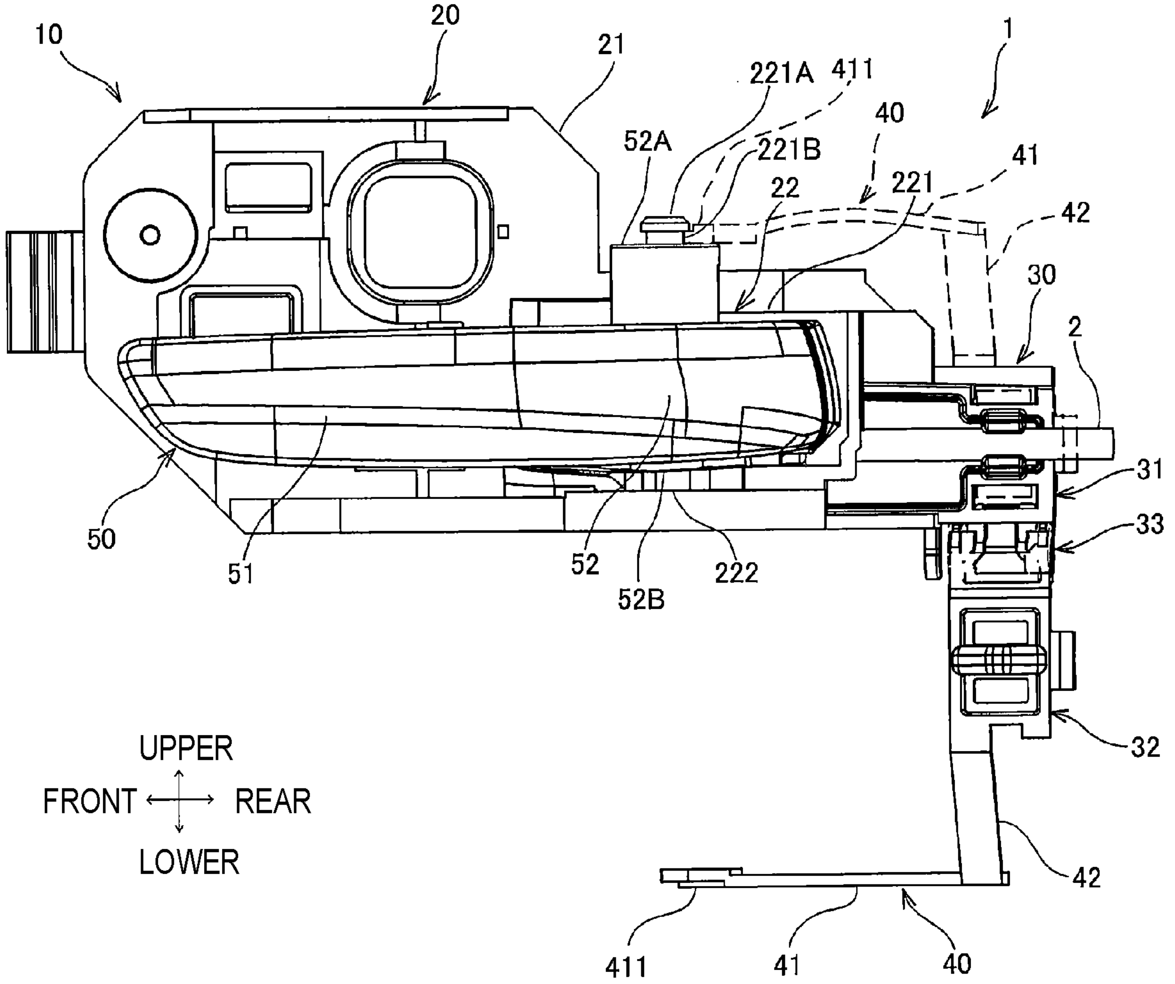
FIG. 7 is a front view showing an unfolded state of a coming-off prevention member before the coming-off prevention member is displaced to a final assembling position, in the inside handle device shown in FIG. 1, as viewed from the vehicle inner side.
Figure 8:
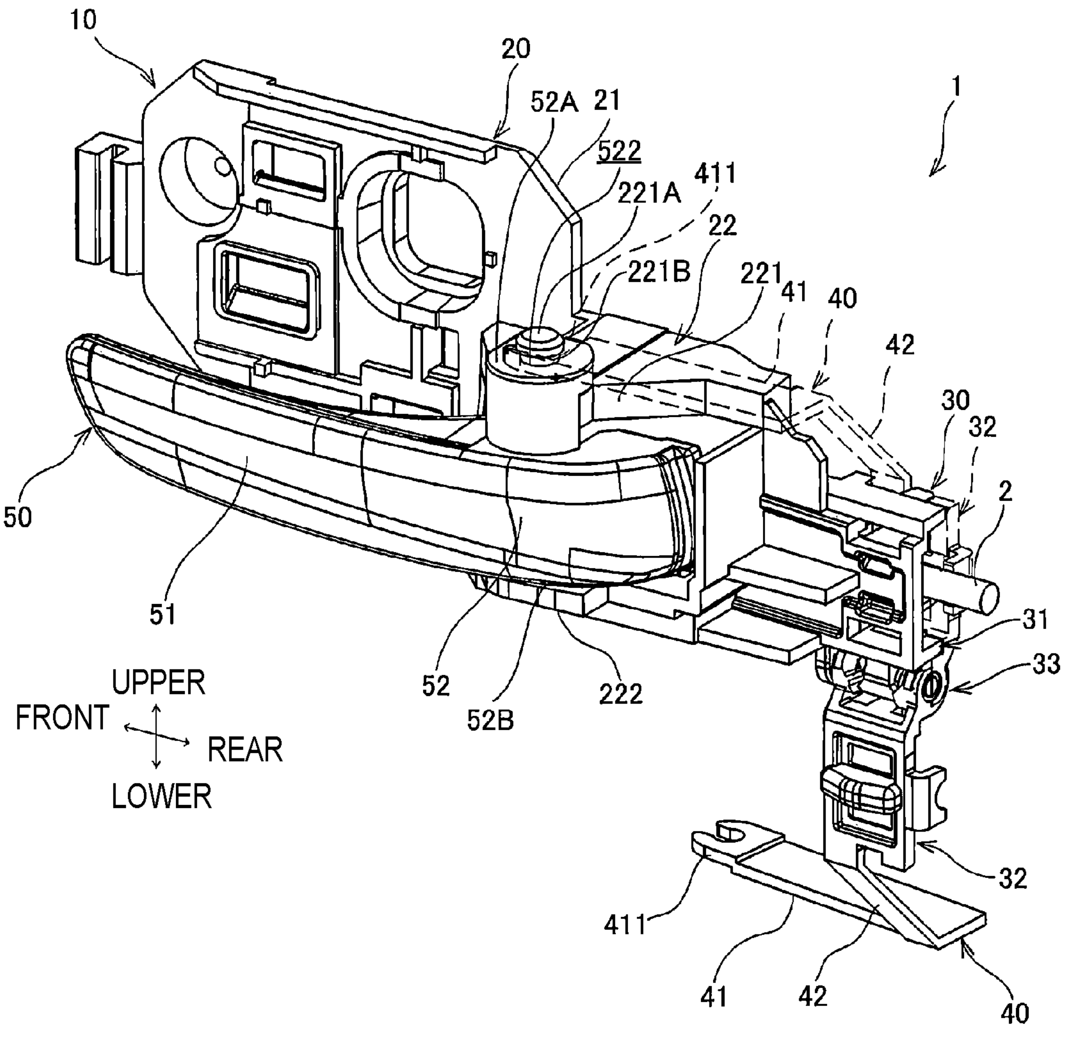
FIG. 8 is a perspective view showing the inside handle device shown in FIG. 7 as viewed from the vehicle inner side.
Figure 9:
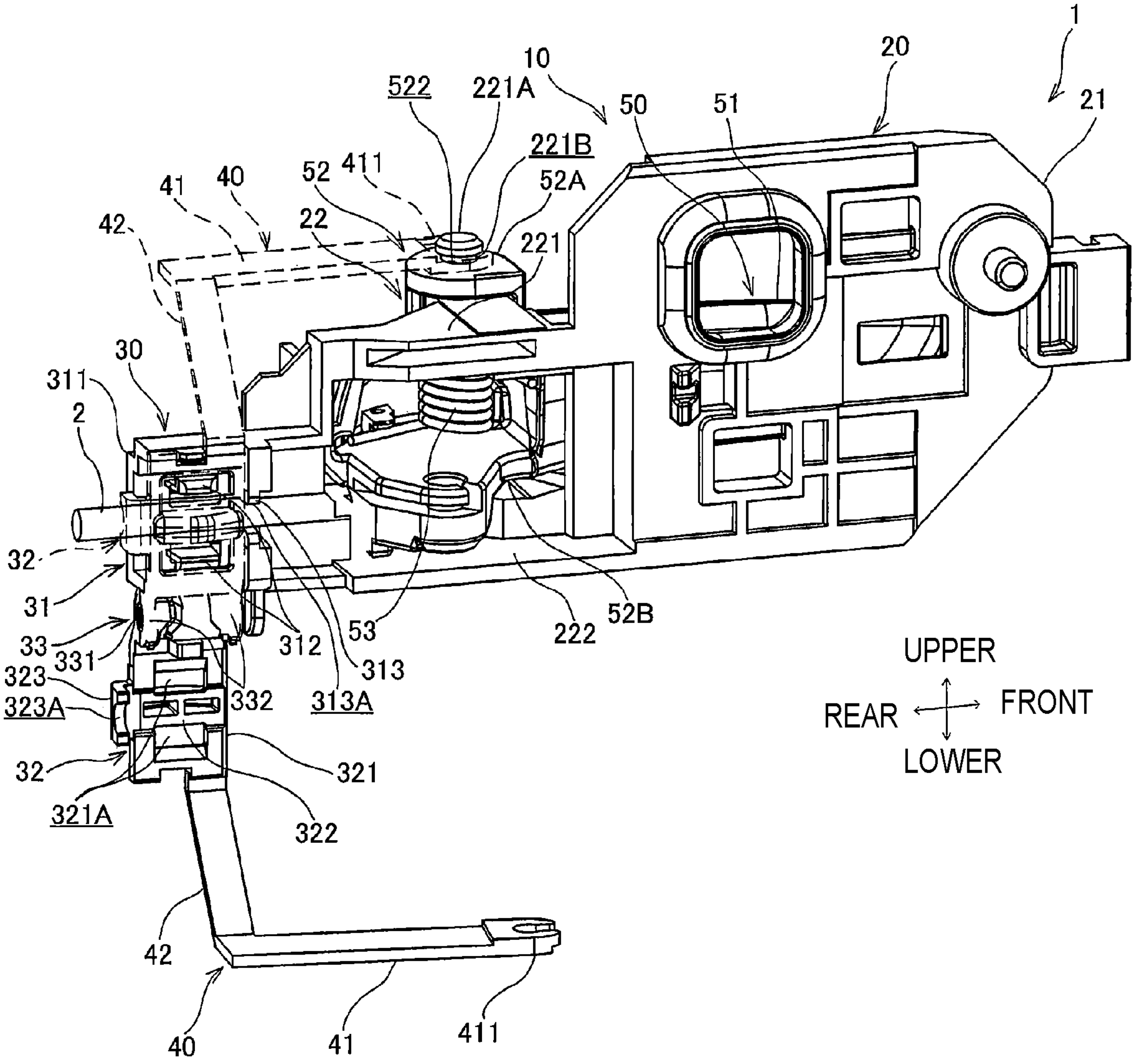
FIG. 9 is a perspective view showing the inside handle device shown in FIG. 7 as viewed from the vehicle outer side.
Figure 10:
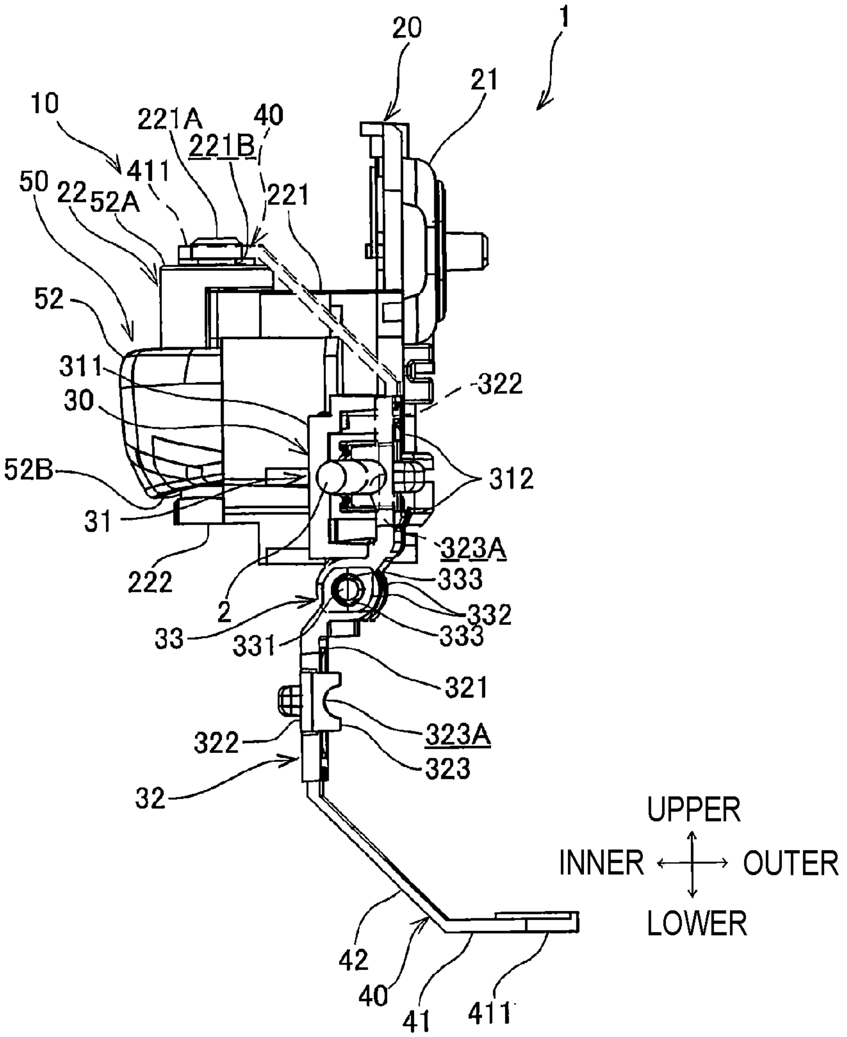
FIG. 10 is a side view showing the inside handle device shown in FIG. 7 as viewed from the vehicle rear side.
Figure 11:
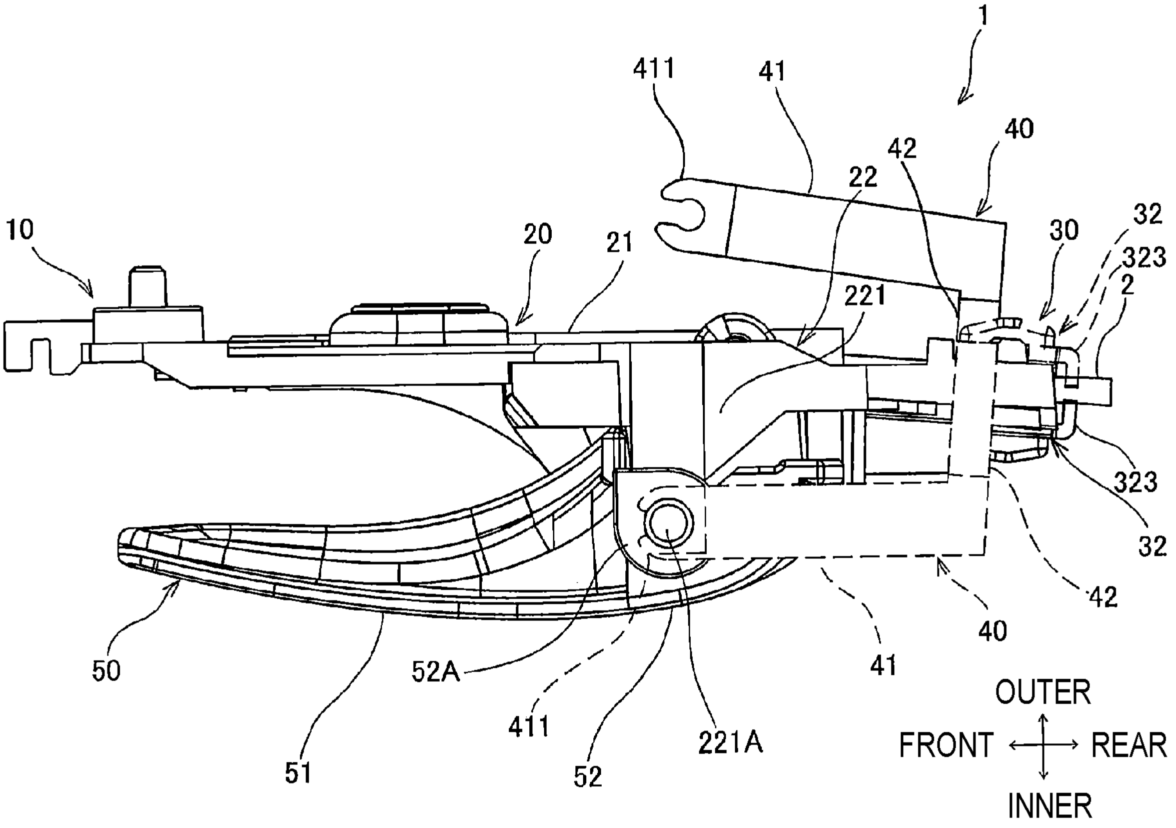
FIG. 11 is a plan view showing the inside handle device shown in FIG. 7.

FIG. 7 is a front view showing an unfolded state of the coming-off prevention member before the coming-off prevention member is displaced to a final assembling position, in the inside handle device 1 shown in FIG. 1, as viewed from the vehicle inner side. FIG. 8 is a perspective view showing the inside handle device 1 shown in FIG. 7 as viewed from the vehicle inner side. FIG. 9 is a perspective view showing the inside handle device 1 shown in FIG. 7 as viewed from the vehicle outer side. FIG. 10 is a side view showing the inside handle device 1 shown in FIG. 7 as viewed from the vehicle rear side. FIG. 11 is a plan view showing the inside handle device 1 shown in FIG. 7. In FIGS. 7 to 11, the cable holding portion 30 and the coming-off prevention member 40 in the unfolded state before being displaced to the final assembling position are indicated by solid lines, and the cable holding portion 30 and the coming-off prevention member 40 in a state after being displaced to the final assembling position are indicated by broken lines.

As shown in FIGS. 1 to 5 and FIGS. 7 to 11, the cable holding portion 30 is formed integrally with an end portion of the vertical wall portion 21 on the rear side in the vehicle front-rear direction, and holds the cable 2. As shown in FIGS. 7 to 11, the cable holding portion 30 includes a fixing portion 31 integrally formed with the end portion of the vertical wall portion 21 on the rear side in the vehicle front-rear direction, a cap portion 32 engaged with the fixing portion 31, and a hinge portion 33 connecting the fixing portion 31 and the cap portion 32. The cable 2 is inserted between the fixing portion 31 and the cap portion 32 and is sandwiched between the fixing portion 31 and the cap portion 32.

As shown in FIG. 9, the fixing portion 31 includes a rectangular plate-shaped base portion 311, a pair of claw portions 312 protruding from the base portion 311 toward the cap portion 32 when the cap portion 32 is engaged with the fixing portion 31, and a cable receiving portion 313 protruding from the base portion 311 toward the cap portion 32 when the cap portion 32 is engaged with the fixing portion 31. The fixing portion 31 is formed integrally with the end portion of the vertical wall portion 21 on the rear side in the vehicle front-rear direction. The pair of claw portions 312 face each other in the vehicle upper-lower direction. The cable receiving portion 313 is a wall portion formed along a boundary line between the fixing portion 31 and the vertical wall portion 21, and is formed with an arc-shaped insertion hole 313A into which the cable 2 is inserted. Here, the cable 2 is inserted between the pair of claw portions 312.

The cap portion 32 includes a rectangular frame-shaped base portion 321, a crosspiece portion 322 provided at a central portion of the base portion 321 in the vehicle upper-lower direction, and a cable receiving portion 323 protruding from the base portion 321 toward the fixing portion 31 when the cap portion 32 is engaged with the fixing portion 31. The base portion 321 is rotatably coupled to the base portion 311 of the fixing portion 31 via the hinge portion 33. A pair of upper and lower openings 321A are formed in the frame-shaped base portion 321 with the crosspiece portion 322 interposed therebetween. When the cap portion 32 is engaged with the fixing portion 31, the pair of claw portions 312 protrude from the cap portion 32 through the pair of openings 321A and engage with the base portion 321 along the upper-lower direction of the base portion 321. In addition, the cable receiving portion 323 is a wall portion formed at an end portion of the base portion 321 on the rear side in the vehicle front-rear direction, and is formed with an arc-shaped insertion hole 323A into which the cable 2 is inserted.

The hinge portion 33 couples a lower end portion of the base portion 311 of the fixing portion 31 and an upper end portion of the base portion 321 of the cap portion 32 in the unfolded state. The hinge portion 33 includes a shaft portion 331 formed integrally with the base portion 311 of the fixing portion 31, and a pair of bearing portions 332 formed integrally with the base portion 321 of the cap portion 32. The shaft portion 331 extends in the vehicle front-rear direction, and the bearing portions 332 rotatably support both ends of the shaft portion 331.

Here, the handle case 10 is an integrally molded product made of resin, and the case main body 20, the cable holding portion 30, and the coming-off prevention member 40 are integrally molded of resin. As indicated by a solid line in FIG. 10, the cable holding portion 30 in the unfolded state before assembly is configured such that the cap portion 32 is unfolded with respect to the fixing portion 31. Further, the cable holding portion 30 in the unfolded state before assembly is configured such that the shaft portion 331 and the bearing portions 332 are connected to each other by a plurality of connecting pieces 333 provided on the hinge portion 33.

The plurality of connecting pieces 333 are plate-shaped members that connect an outer peripheral surface of the shaft portion 331 and inner peripheral surfaces of the bearing portions 332. The plurality of connecting pieces 333 are arranged at predetermined intervals around the shaft portion 331.

The plurality of connecting pieces 333 are configured to be broken when the bearing portion 332 is relatively rotated around the shaft portion 331. As a result, the cap portion 32 is rotatably supported with respect to the fixing portion 31 by the hinge portion 33, and the cap portion 32 can be rotated to the assembling position, so that the pair of claw portions 312 of the fixing portion 31 can be engaged with the base portion 321 of the cap portion 32.

As shown in FIGS. 7 to 11, the coming-off prevention member 40 is an L-shaped arm member, and includes an elongated plate-shaped first arm portion 41 extending horizontally at the assembling position indicated by a broken line in the drawing, and an elongated plate-shaped second arm portion 42 connecting a base end of the first arm portion 41 and the cap portion 32. A locking portion 411 to be engaged with the groove 221B of the boss 221A is formed at the front end of the first arm portion 41. The locking portion 411 is formed in a C shape, and one end portion in a longitudinal direction of the first arm portion 41 is opened. The second arm portion 42 extends upward in the vehicle upper-lower direction from an upper end of the cap portion 32 at the assembling position indicated by the broken line in the drawing.

Here, since the coming-off prevention member 40 is integrally molded with the cap portion 32 and is supported by the cable holding portion 30, rigidity of the coming-off prevention member 40 is maintained. As a result, the locking portion 411 is prevented from being detached from the groove 221B, and the handle lever 50 is prevented from coming off the handle case 10. On the other hand, as indicated by the broken line in FIG. 7, the coming-off prevention member 40 has flexibility. In order to engage the C-shaped locking portion 411 at the front end of the first arm portion 41 with the groove 221B of the boss 221A, an operation of moving the locking portion 411 horizontally is necessary, and the operation can be realized by bending the first arm portion 41.

As described above, in the inside handle device 1 of the present embodiment, the handle lever 50 is inserted into the handle case 10 along the rotation axis of the handle lever 50 with respect to the handle case 10, and the movement of the handle lever 50 in the direction along the rotation axis is restricted by the coming-off prevention member 40, so that the handle lever 50 is prevented from coming off the case main body 20. Here, the coming-off prevention member 40 is coupled to the case main body 20 via the cable holding portion 30 so as to be displaceable between the assembling position at which the handle lever 50 is prevented from coming off the case main body 20 and an unfolded position at which the coming-off prevention member 40 is unfolded from the assembling position. Accordingly, in the configuration in which the handle lever 50 is rotatably assembled by being inserted into the handle case 10 along the rotation axis, the handle lever 50 can be prevented from coming off the case main body 20 regardless of the presence or absence of a lock knob for pressing the handle lever 50. In addition, in the configuration in which the handle lever 50 is rotatably assembled by being inserted into the handle case 10 along the rotation axis, the handle lever 50 can be prevented from coming off the case main body 20 regardless of the presence or absence of upper and lower frame portions of the handle case 10.

In the inside handle device 1 in a state (Assy state) in which the assembly of the inside handle device 1 is completed before the inside handle device 1 is assembled to the door trim, the coming-off of the handle lever 50 from the case main body 20 is prevented by the coming-off prevention member 40, so that an operation of assembling the inside handle device 1 to the door trim can be performed without worrying about the coming-off of the handle lever 50 from the case main body 20.

In the inside handle device 1 of the present embodiment, the fixing portion 31 integrally formed with the case main body 20 and the cap portion 32 are coupled to each other so as to be unfoldable by the hinge portion 33, and the coming-off prevention member 40 is formed integrally with the cap portion 32. Accordingly, by displacing the cap portion 32 from the unfolded state to a position at which the cap portion 32 is engaged with the fixing portion 31, the coming-off prevention member 40 can be displaced from the position before assembly to the assembling position. Further, by engaging the cap portion 32 with the fixing portion 31, it is possible to ensure the rigidity of the coming-off prevention member 40 at the assembling position, and it is possible to prevent the locking portion 411 from being detached from the groove 221B of the boss 221A and to prevent the handle lever 50 from coming off the case main body 20 by the coming-off prevention member 40. Here, since the rigidity of the coming-off prevention member 40 at the assembling position can be ensured, even if the locking portion 411 is not press-fitted into the groove 221B of the boss 221A as in the case of using a C-ring (C-shaped retaining ring), it is possible to prevent the locking portion 411 from being detached from the groove 221B of the boss 221A and to prevent the handle lever 50 from coming off the case main body 20 by the coming-off prevention member 40. Therefore, it is possible to eliminate the need for a press-fitting operation as in the case of using the C-ring, and it is possible to improve workability.

In the inside handle device 1 of the present embodiment, the boss 221A provided in the case main body 20 is inserted into the boss insertion hole 522 provided in the handle lever 50, and the locking portion 411 provided at the front end of the coming-off prevention member 40 is locked to the groove 221B provided in the boss 221A. As a result, the handle lever 50 inserted into the case main body 20 along the rotation axis is restricted from moving in the direction along the rotation axis. Therefore, the handle lever 50 can be prevented from coming off the case main body 20.

In the inside handle device 1 of the present embodiment, the coming-off prevention member 40 includes the first arm portion 41 having the locking portion 411 at the front end, and the second arm portion 42 connecting the base end of the first arm portion 41 and the cap portion 32. The first arm portion 41 and the second arm portion 42 constitute the L-shaped coming-off prevention member 40, and the coming-off prevention member 40 can be brought into an assembled state in which the coming-off prevention member 40 extends from the cap portion 32 to a distal end of the boss 221A and the unfolded state in which the coming-off prevention member 40 extends from the cap portion 32 to a lower side of the handle lever 50. Further, since the first arm portion 41 has flexibility, the locking portion 411 can be engaged with the groove 221B of the boss 221A while bending the first arm portion 41.

In the inside handle device 1 of the present embodiment, a coupling portion that couples the coming-off prevention member 40 to the case main body 20 so as to be unfoldable with respect to the case main body 20 is the cable holding portion 30. That is, instead of providing a dedicated coupling portion, the cable holding portion 30 for holding the cable 2 is used as the coupling portion that couples the coming-off prevention member 40 to the case main body 20 so as to be unfoldable with respect to the case main body 20. As a result, the cost can be reduced as compared with the case where the above-described dedicated coupling portion is provided.

In the inside handle device 1 of the present embodiment, the handle case 10 is an integrally molded product that is continuous from the case main body 20 to the coming-off prevention member 40 by the connecting piece 333 provided on the hinge portion 33. Accordingly, the number of components can be reduced and the number of assembling steps can be reduced as compared with a case where the coming-off prevention member 40 is a separate component.

Although the inside handle device according to the present disclosure has been described above based on the above embodiment, the present disclosure is not limited thereto, and modifications may be made without departing from the gist of the present disclosure, or other techniques may be combined.

For example, although the coming-off prevention member 40 is formed integrally with the cable holding portion 30 in the above embodiment, the coming-off prevention member 40 may be coupled to the case main body 20 so as to be unfoldable via another member. In the above embodiment, the boss 221A provided on the case main body 20 side is inserted into the boss insertion hole 522 provided on the handle lever 50 side, and the coming-off prevention member 40 is locked to the boss 221A provided on the case main body 20 side, but the present disclosure is not limited thereto. A boss provided on the handle lever 50 side may be inserted into a boss insertion hole provided on the case main body 20 side, and the coming-off prevention member 40 may be locked to the boss provided on the handle lever 50 side.

In the above embodiment, the coming-off prevention member 40 is the L-shaped arm member, but the shape of the coming-off prevention member 40 is appropriately changed. Further, the locking portion 411 of the coming-off prevention member 40 is formed in the C shape that is open to a front end side in the front-rear direction of the first arm portion 41, but the locking portion 411 may be formed in a shape that is open to one end side in a width direction of the first arm portion 41.

In the above embodiment, the inside handle device 1 without a lock knob has been described as an example, but the present disclosure can also be applied to an inside handle device with a lock knob. Further, it is not essential to form the handle case 10 of an integrally molded product in which the connecting piece 333 is provided on the hinge portion 33 and the case main body 20 and the coming-off prevention member 40 are continuous. Without providing the connecting piece 333, the case main body 20 side and the coming-off prevention member 40 side may constitute a handle case as separate components via the hinge portion 33.

What is claimed is:

1. An inside handle device comprising:
a handle case; and
a handle lever rotatably supported by the handle case,
wherein the handle lever is inserted into the handle case along a rotation axis of the handle lever with respect to the handle case,
wherein the handle case includes
a case main body into which the handle lever is inserted,
a coming-off prevention member configured to restrict a movement of the handle lever in a direction along the rotation axis and to prevent the handle lever from coming off the case main body, and
a hinge portion for coupling the coming-off prevention member to the case main body,
wherein the hinge portion is configured such that the coming-off prevention member is displaceable between an assembling position at which the handle lever is prevented from coming off the case main body and an unfolded position at which the coming-off prevention member is unfolded from the assembling position.

2. An inside handle device comprising:
a handle case; and
a handle lever rotatably supported by the handle case,
wherein the handle lever is inserted into the handle case along a rotation axis of the handle lever with respect to the handle case,
wherein the handle case includes
a case main body into which the handle lever is inserted, and
a coming-off prevention member configured to restrict a movement of the handle lever in a direction along the rotation axis and to prevent the handle lever from coming off the case main body,
wherein the coming-off prevention member is coupled to the case main body,
wherein the coming-off prevention member is configured to be displaceable between an assembling position at which the handle lever is prevented from coming off the case main body and an unfolded position at which the coming-off prevention member is unfolded from the assembling position,
wherein the handle case further includes a cable holding portion that couples the case main body and the coming-off prevention member,
wherein the cable holding portion includes
a fixing portion formed integrally with the case main body,
a cap portion configured to engage with the fixing portion, and
a hinge portion configured to couple the cap portion to the fixing portion so as to be unfoldable, and
wherein the coming-off prevention member is formed integrally with the cap portion.

3. An inside handle device comprising:
a handle case; and
a handle lever rotatably supported by the handle case,
wherein the handle lever is inserted into the handle case along a rotation axis of the handle lever with respect to the handle case,
wherein the handle case includes
a case main body into which the handle lever is inserted, and
a coming-off prevention member configured to restrict a movement of the handle lever in a direction along the rotation axis and to prevent the handle lever from coming off the case main body,
wherein the coming-off prevention member is coupled to the case main body,
wherein the coming-off prevention member is configured to be displaceable between an assembling position at which the handle lever is prevented from coming off the case main body and an unfolded position at which the coming-off prevention member is unfolded from the assembling position,
wherein the handle lever is provided with a boss insertion hole,
wherein the case main body is configured to be inserted into the boss insertion hole, and includes a boss in which a groove is formed at a distal end of the boss, and
wherein the coming-off prevention member includes a locking portion configured to be locked to the groove.

4. The inside handle device according to claim 2, further comprising:
a cable configured to transmit a force between the handle lever and a door lock device,
wherein the cable is sandwiched between the fixing portion and the cap portion when the cap portion is engaged with the fixing portion.

5. The inside handle device according to claim 2,
wherein the handle case is an integrally molded product in which the case main body, the cable holding portion, and the coming-off prevention member are integrally molded via a connecting piece provided on the hinge portion, and
wherein the connecting piece is configured to be broken when the cap portion is rotated around the hinge portion.

6. The inside handle device according to claim 2,
wherein the handle lever is provided with a boss insertion hole,
wherein the case main body is configured to be inserted into the boss insertion hole, and includes a boss in which a groove is formed at a distal end of the boss, and
wherein the coming-off prevention member includes a locking portion configured to be locked to the groove.

7. The inside handle device according to claim 6,
wherein the coming-off prevention member includes
a first arm portion including the locking portion at a distal end of the first arm portion, and
a second arm portion connecting the first arm portion and the cap portion to each other.

8. The inside handle device according to claim 7,
wherein the first arm portion has flexibility.

9. The inside handle device according to claim 6, further comprising:
a cable configured to transmit a force between the handle lever and a door lock device,
wherein the cable is sandwiched between the fixing portion and the cap portion when the cap portion is engaged with the fixing portion.

10. The inside handle device according to claim 6,
wherein the handle case is an integrally molded product in which the case main body, the cable holding portion, and the coming-off prevention member are integrally molded via a connecting piece provided on the hinge portion, and wherein the connecting piece is configured to be broken when the cap portion is rotated around the hinge portion.

* * * * *